United States Patent
Phan et al.

(10) Patent No.: US 8,862,264 B2
(45) Date of Patent: Oct. 14, 2014

(54) VERIFICATION SYSTEMS FOR FILTER ELEMENTS OF SMOKING ARTICLES, AND ASSOCIATED METHODS

(75) Inventors: Hung Phan, Clemmons, NC (US); Tim Goodman, Clemmons, NC (US); Greg Williams, Kernersville, NC (US); Gary Wood, Rural Hall, NC (US); Brent Carter, High Point, NC (US)

(73) Assignee: R.J. Reynolds Tobacco Company, Winston-Salem, NC (US)

( * ) Notice: Subject to any disclaimer, the term of this patent is extended or adjusted under 35 U.S.C. 154(b) by 459 days.

(21) Appl. No.: 13/268,229

(22) Filed: Oct. 7, 2011

(65) Prior Publication Data

US 2013/0090757 A1    Apr. 11, 2013

(51) Int. Cl.
  G06F 7/00    (2006.01)
  G05B 19/418    (2006.01)
  A24D 3/02    (2006.01)
  A24C 5/352    (2006.01)

(52) U.S. Cl.
  CPC .......... A24C 5/352 (2013.01); G05B 19/4183 (2013.01); A24D 3/0295 (2013.01)
  USPC .......... 700/215; 700/115; 235/435; 414/403; 414/416.05; 53/410

(58) Field of Classification Search
  USPC .......................................... 700/215
  See application file for complete search history.

(56) References Cited

U.S. PATENT DOCUMENTS

| | | | |
|---|---|---|---|
| 4,827,423 A | | 5/1989 | Beasley et al. |
| 5,190,428 A | * | 3/1993 | Bryant et al. ................ 414/403 |
| 5,452,984 A | | 9/1995 | Porter et al. |
| 5,478,184 A | * | 12/1995 | Bryant et al. ............ 414/416.05 |
| 6,478,137 B2 | * | 11/2002 | Hebels et al. .............. 198/347.1 |
| 6,766,951 B2 | * | 7/2004 | von Bismarck et al. ...... 235/435 |
| 7,474,935 B2 | * | 1/2009 | Fetahovic ..................... 700/115 |
| 2004/0107674 A1 | * | 6/2004 | von Bismarck ................ 53/410 |
| 2011/0058924 A1 | | 3/2011 | Sikora et al. |

FOREIGN PATENT DOCUMENTS

GB    2188601    10/1987

OTHER PUBLICATIONS

International Search Report and Written Opinion of the International Searching Authority from corresponding International Application No. PCT/US2012/058887 mailed Jun. 7, 2013.

(Continued)

*Primary Examiner* — Gene Crawford
*Assistant Examiner* — Kyle Logan
(74) *Attorney, Agent, or Firm* — Womble Carlyle Sandridge & Rice, LLP

(57) ABSTRACT

In a supplying system using containers for supplying groups of filter elements to smoking article assembling equipment, each container has a unique source of information that travels with the container. An unloader receives and unloads the containers. An automated data reader is proximate the unloader for reading the source of information for each container before it is unloaded. A computerized controller uses the information read by the automated data reader to obtain information from a database. The information from the database is compared to information from another source to verify that the proper filter elements are being supplied. The computerized controller allows, or instructs, the unloader to unload correctly supplied filter elements, and stops the unloader from unloading incorrectly supplied filter elements.

17 Claims, 4 Drawing Sheets

(56) References Cited

OTHER PUBLICATIONS

Partial International Search from corresponding International Application No. PCT/US2012/058887 mailed Mar. 21, 2013 (received Apr. 11, 2013).

International Preliminary Report on Patentability for corresponding International Application No. PCT/US2012/058887 mailed Jan. 16, 2014.

* cited by examiner

VERIFICATION SYSTEMS FOR FILTER ELEMENTS OF SMOKING ARTICLES, AND ASSOCIATED METHODS

FIELD OF THE DISCLOSURE

The present disclosure relates to filtered smoking articles and, more particularly, to the supplying of predetermined filter elements during the manufacture of the filtered smoking articles.

BACKGROUND

Popular smoking articles, such as cigarettes, have a substantially cylindrical rod-shaped structure and include a charge, roll or column of smokable material, such as shredded tobacco (e.g., in cut filler form), surrounded by a paper wrapper, thereby forming a so-called "smokable rod" or "tobacco rod." Normally, a cigarette has a cylindrical filter element aligned in an end-to-end relationship with the tobacco rod. Typically, a filter element comprises plasticized cellulose acetate tow circumscribed by a paper material known as "plug wrap." Typically, the filter element is attached to one end of the tobacco rod using a circumscribing wrapping material known as "tipping paper." It also has become desirable to perforate the tipping material and plug wrap, in order to provide dilution of drawn mainstream smoke with ambient air. A filtered cigarette is employed by a smoker by lighting the unfiltered end thereof and burning the tobacco rod. The smoker then receives mainstream smoke into his/her mouth by drawing on the filter end of the cigarette.

There are different types of filtered cigarettes that may be formed from various combinations of numerous different types of filter elements and tobacco-containing rods. Accordingly, it is important for the proper filter elements to be provided to the assembling equipment when filtered cigarettes of a particular type are to be manufactured. Otherwise, the wrong type of cigarettes will be manufactured unintentionally. Modern smoking article production equipment operates at high speeds, such that by the time it is determined that the wrong filter elements have been provided, a large number of the wrong type of cigarettes may have been manufactured and packaged. This may result, for example, in a mismatch between the branding or other information on the packages and the cigarettes therein, such that corrective measures have to be taken.

Accordingly, there is a need for systems and methods that seek to verify that the proper filter elements are provided to the assembling equipment.

SUMMARY

One aspect of this disclosure is the provision of systems and methods that seek to verify that the proper filter elements are provided to smoking article assembling equipment.

In accordance with one aspect of this disclosure, a method of at least supplying filter elements for smoking articles may include: having first information that is, or is associated with, an identifier of a group of filter elements; reading, with at least one automated data reader, second information that is, or is associated with, an identifier of a container, wherein the second information is read from a source (e.g., indicia, barcode, RFID tag, magnetic tape and/or the like) that is for traveling with the container; associating, in a computer database, the identifier of the group of the filter elements with the identifier of the container; transporting the container while the group of filter elements is at least partially contained in the container, so that both the group of filter elements and the source of the second information travel with the container to a predetermined location; and then verifying that the (proper) group of filter elements, which is at least partially contained by the container, is at the predetermined location.

The verifying may include reading, with an other automated data reader, the second information from the source of the second information while the container at least partially contains the group of filter elements and the container is proximate the predetermined location, and querying the database using the second information read by the other automated data reader. The verifying may include knowing (e.g., receiving) the identifier of the group of filter elements from the database using the second information read by the other automated data reader. The verifying may include knowing (e.g., receiving) the identifier of the group of filter elements from another source (e.g., a computerized management system), and verifying sameness between: (i) the identifier of the group of filter elements known from the database, and (ii) the identifier of the group of filter elements known from the other source. The group of filter elements may be unloaded from the container in response to the verifying. The unloading may be carried out by an unloader.

The above-described method of at least supplying filter elements for smoking articles and verifying that the proper filter elements are being supplied may be repeated substantially continually, in serial fashion with numerous containers (e.g., trays) with unique identifiers, and the containers may at least partially contain different types of filter elements with different identifiers.

The above-described method may further include a situation where the correctness of the supplied filter elements cannot be verified. For example, the method may further include: reading, with the at least one automated data reader, third information that is, or is associated with, an identifier of a second group of filter elements; reading, with the at least one automated data reader, fourth information that is, or is associated with, an identifier of a second container, wherein the fourth information is read from a source (e.g., indicia, barcode, RFID tag, magnetic tape and/or the like) that is for traveling with the second container; associating, in the computer database, the identifier of the second group of the filter elements with the identifier of the second container; transporting the second container while the second group of filter elements is at least partially contained in the second container, so that both the second group of filter elements and the source of the fourth information travel with the second container to the predetermined location; then determining (using the database and the other source (e.g., the computerized management system), that the second group of filter elements, which is at least partially contained by the second container, should not be at the predetermined location; inhibiting any unloading of the second group of filter elements from the second container in response to the determining that the second group of filter elements should not be at the predetermined location; and then removing the second container from the predetermined location while the second group of filter elements is at least partially contained in the second container.

In accordance with one aspect of this disclosure, a method of at least supplying filter elements for smoking articles includes at least partially containing groups of filter elements in respective containers, and carrying out several steps for each container and the group of filter elements at least partially contained in the container. For each container and the group of filter elements at least partially contained in the container, the steps carried out may include: reading, with at least one automated data reader, first information that is, or is associated with, an identifier of the group of filter elements; reading, with the at least one automated data reader, second information that is, or is associated with, an identifier of the container, wherein the second information is read from a source (e.g., indicia, barcode, RFID tag, magnetic tape and/or the like) that is for traveling with the container; associating, in a computer database, the identifier of the group of the filter elements with the identifier of the container; transporting the container while the group of filter elements is at least partially contained in the container, so that both the group of filter elements and the source of the second information travel with the container to a predetermined location; reading, with an other automated data reader, the second information from the source of the second information while the container at least partially contains the group of filter elements and the container is proximate the predetermined location; querying the database using the second information read by the other automated data reader; knowing (e.g., receiving) from the database the identifier of the group of filter elements in response to the querying of the database; and determining whether the identifier of the group of filter elements known from the database matches an identifier known (e.g., received) from another source, such as a computerized management system. For each container and the group of filter elements at least partially contained in the container: the group of filter elements are unloaded from the container in response to determining that the identifier of the group of filter elements known from the database matches the identifier known from the other source (e.g., the computerized management system), or the group of filter elements are not unloaded from the container in response to determining that the identifier of the group of filter elements known from the database does not match the identifier received from the other source.

One aspect of this disclosure is the provision of a supplying system for using a plurality of containers for respectively supplying groups of filter elements to smoking article assembling equipment, wherein each container of the plurality of containers has a source (e.g., indicia, barcode, RFID tag, magnetic tape and/or the like) of information that travels with the container. The system may include an apparatus (e.g., an unloader) for serially receiving and acting upon (e.g., unloading) the containers while the containers respectively at least partially contain the groups of the filter elements; an automated data reader proximate the apparatus for reading the sources of information while the containers are proximate the apparatus; and a computerized controller operatively associated with the apparatus and the automated data reader. The computerized controller may be operative for facilitating at least the following for each container of the plurality of containers, the source of information of the container, and the group of filter elements at least partially contained by the container: querying a database using information read from the source of information by the automated data reader; knowing (e.g. receiving) from the database an identifier of the group of filter elements at least partially contained by the container; and determining whether the identifier of the group of filter elements known from the database matches an identifier known (e.g., received) from another source (e.g., a computerized management system). The computerized controller may either: instruct the apparatus to proceed with supplying (e.g., unloading) the group of filter elements at least partially contained by the container to the smoking article assembling equipment in response to determining that the identifier of the group of filter elements known from the database matches the identifier known from the other source, or instruct the apparatus to inhibit any supplying (e.g., unloading) of the group of filter elements at least partially contained by the container to the smoking article assembling equipment in response to determining that the identifier of the group of filter elements known from the database does not match the identifier known from the other source.

The foregoing presents a simplified summary of some aspects of this disclosure in order to provide a basic understanding. The foregoing summary is not an extensive summary of the disclosure and is not intended to identify key or critical elements of the invention or to delineate the scope of the invention. The purpose of the foregoing summary is to present some concepts of this disclosure in a simplified form as a prelude to the more detailed description that is presented later. For example, other aspects will become apparent from the following.

BRIEF DESCRIPTION OF THE DRAWINGS

Having described some aspects of this disclosure in general terms, reference will now be made to the accompanying drawings, which are not necessarily drawn to scale. The drawings are exemplary only, and should not be construed as limiting the invention.

DETAILED DESCRIPTION

Exemplary embodiments of this disclosure are described below and illustrated in the accompanying figures, in which like numerals refer to like parts throughout the several views. The embodiments described provide examples and should not be interpreted as limiting the scope of the invention. Other embodiments, and modifications and improvements of the described embodiments, will occur to those skilled in the art and all such other embodiments, modifications and improvements are within the scope of the present invention.

An aspect of this disclosure is the provision improvements that are associated with filter-supplying equipment 34 (FIG. 3) that is for supplying filter elements to assembling equipment, wherein the improvements seek to verify that the proper filter elements are provided to the assembling equipment. Whereas the improvements may be considered in isolation and/or solely in combination with the filter-supplying equipment 34, the improvements and the filter-supplying equipment may be parts of a larger system for making and packaging filtered smoking articles ("making and packaging system"). The making and packaging system is generally described in the following, in accordance with a first embodiment of this disclosure.

The making and packaging system also includes equipment for making the filter elements ("filter-making equipment"), rod-making equipment for making tobacco rods, rod-supplying equipment for supplying the tobacco rods to the assembling equipment, and packaging equipment for enclosing the filtered smoking articles, which were assembled by the assembling equipment, into containers such as, but not limited to, paperboard boxes. In accordance with the first embodiment, the making and packaging system may be conventional, except for incorporating improvements that seek to verify that the proper filter elements are provided to the assembling equipment, as will be discussed in greater detail below.

Figure 1:
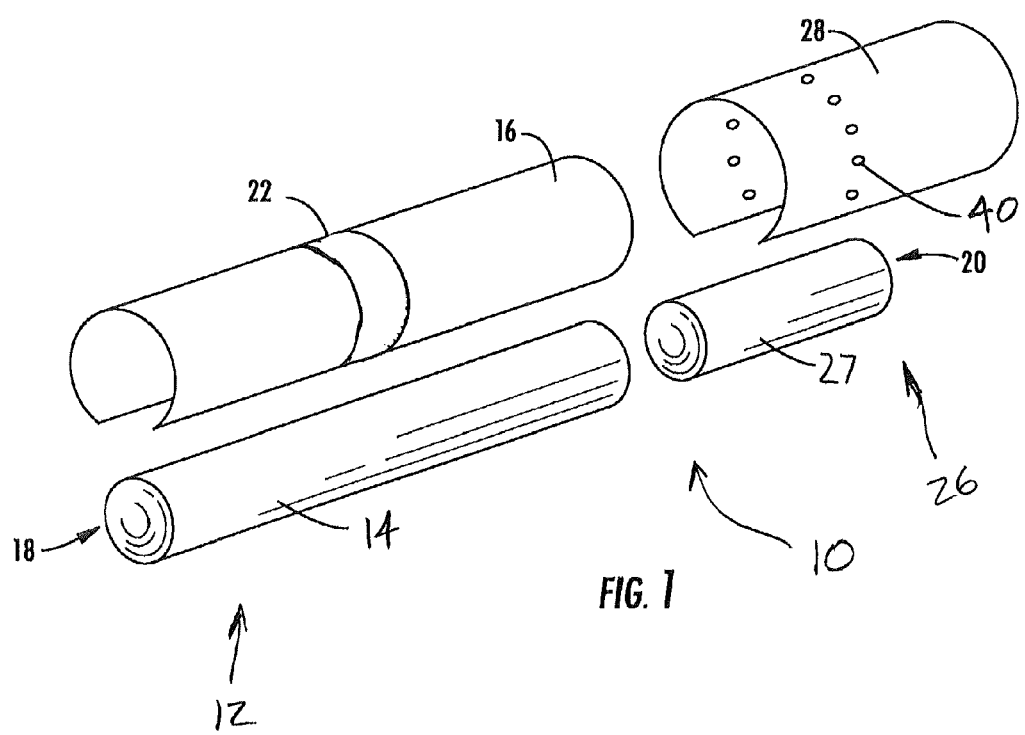
FIG. 1 is an exploded perspective view of a smoking article having the form of a cigarette, showing the smokable material, filter element, and wrapping material components of the cigarette, wherein the tipping material of the cigarette is not shown.

In accordance with the first embodiment, the making and packaging equipment, which includes the filter-supplying equipment 34 (FIG. 3), manufactures smoking articles that may be in the form of cigarettes. Referring to FIG. 1, there is shown a smoking article 10 in the form of a conventional cigarette. The cigarette 10 includes a generally cylindrical rod 12 that includes both a charge or roll of smokable filler material 14 and wrapping material 16. The filler material 14 is contained in the circumscribing wrapping material 16. The rod 12 is conventionally referred to as a "tobacco rod." The ends of the tobacco rod 12 are open to expose the smokable filler material 14. The cigarette 10 is shown as having one optional band 22 (e.g., a printed coating including a film-forming agent, such as starch, ethylcellulose, or sodium alginate) applied to the wrapping material 16, and that band circumscribes the cigarette rod in a direction transverse to the longitudinal axis of the cigarette. That is, the band 22 provides a cross-directional region relative to the longitudinal axis of the cigarette. The band 22 can be printed on the inner surface of the wrapping material (i.e., facing the smokable filler material 14), or less preferably, on the outer surface of the wrapping material. Although the cigarette 10 can possess a wrapping material having one optional band, the cigarette also can possess wrapping material having further optional spaced bands numbering two, three, or more. The tobacco rod 12 may be conventional, and may be formed in a conventional manner by conventional rod-making equipment. A wide variety of tobacco rods are within the scope of this disclosure.

At one end of the tobacco rod 12 is the lighting end 18, and at the mouth end 20 is positioned a filter element 26. The filter element 26 is positioned adjacent one end of the tobacco rod 12 such that the filter element and tobacco rod are axially aligned in an end-to-end relationship, typically abutting one another. The filter element 26 may have a generally cylindrical shape, and the diameter thereof may be essentially equal to the diameter of the tobacco rod 12. The ends of the filter element 26 permit the passage of air and smoke therethrough.

Figure 2:
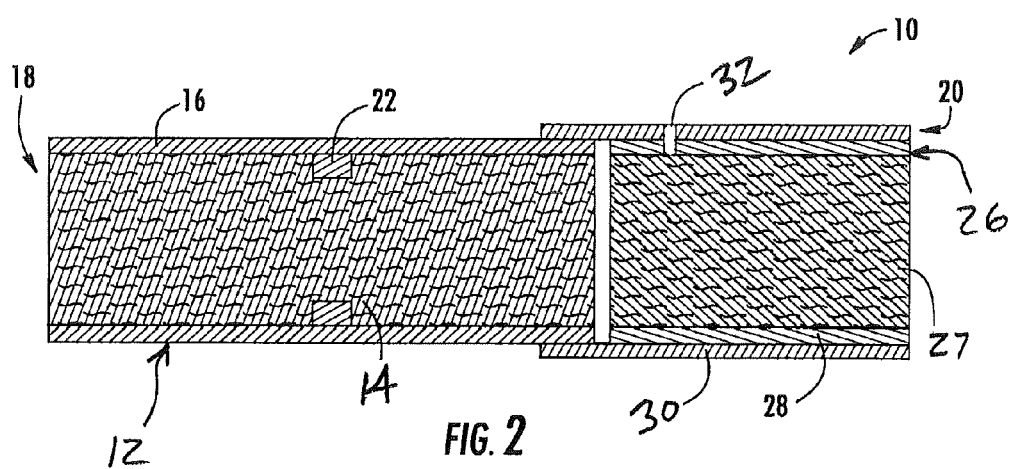
FIG. 2 is a cross-sectional view of the cigarette of FIG. 1, including the tipping material.

A cross-sectional view of a smoking article configured as shown in FIG. 1 is shown in FIG. 2. As shown therein, the filter element 26 includes both filter material 27 and an outer plug wrap 28. The filter material 27 is circumscribed along its outer circumference or longitudinal periphery by the outer plug wrap 28. The plug wrap 28 is affixed to the filter element 26 using adhesive material. Although only one section of filter material 27 is shown in FIG. 2, other filter element configurations with multiple segments and/or cavities could be used without departing from the scope of this disclosure. That is, a wide variety of filter elements 26 are within the scope of this disclosure.

In the cigarette 10, the filter element 26 and the tobacco rod 12 are attached to one another by tipping material 30 that typically circumscribes the entire length of the filter element 26 and an adjacent region of the tobacco rod 12. The inner surface of the tipping material 30 is fixedly secured to both the outer surface of the plug wrap 28 and the outer surface of the wrapping material 16 of the tobacco rod 12. The tipping material 30 may be fixedly secured to the outer surfaces of the plug wrap 28 and wrapping material 16 in a conventional manner, with any suitable adhesive material. The tipping material 30 typically extends over the entire length of the filter element 26, and about 2 mm to about 6 mm, often about 3 mm to about 5 mm, and frequently about 4 mm over the length of the adjacent region of the tobacco rod 12.

A ventilated or air diluted smoking article can be provided with an optional air dilution features, such as a series of perforations 32, each of which extend through the tipping material 30 and plug wrap 28. The optional perforations 32 can be made by various techniques known to those of ordinary skill in the art, such as laser perforation techniques. Alternatively, so-called off-line air dilution techniques can be used (e.g., through the use of porous paper plug wrap and pre-perforated tipping paper). For cigarettes that are air diluted or ventilated, the amount or degree of air dilution or ventilation can vary. Frequently, the amount of air dilution for an air diluted cigarette is greater than about 10 percent, generally is greater than about 20 percent, often is greater than about 30 percent, and sometimes is greater than about 40 percent. Typically, the upper level for air dilution for an air diluted cigarette is less than about 80 percent, and often is less than about 70 percent. As used herein, the term "air dilution" is the ratio (expressed as a percentage) of the volume of air drawn through the air dilution means to the total volume and air and smoke drawn through the cigarette and exiting the extreme mouth end 20 of the cigarette 10.

In accordance with the first embodiment, the system for making cigarettes 10 is configured to provide "two-up" cigarette rods 60 (FIG. 4), each of which is cut in half to provide two of the cigarettes, as will be discussed in greater detail below. Although other manufacturing processes could be modified to incorporate methods and apparatus of this disclosure that seek to verify that the proper filter elements are provided to the smoking article production equipment, this disclosure will focus on the two-up rod manufacturing processes for the propose of providing an example, and not for the purpose of limiting the scope of this disclosure.

In accordance with the first embodiment, precursors 70 (FIG. 4) of the filter elements 26 (FIGS. 1 and 2) may be formed using filter-making equipment. The filter elements 26 may be formed by cutting the precursors, namely two-up filter elements 70 (FIG. 4), in half, as will be discussed in greater detail below. The two-up filter elements 70 may be generally referred to as filter elements, although they are sometimes referred to in this Detailed Description section of this disclosure as two-up filter elements for ease of understanding, and not for the purpose of limiting the scope of this disclosure.

In accordance with the first embodiments, filter rods, and the two-up filter elements 70 and filter elements 26 formed therefrom, may be formed having different characteristics. For example, two-up filter elements 70 and filter elements 26 may or may not incorporate cavities, smoke-altering materials such as activated carbon, additives, and the like. In addition, the filter material 27 can vary, and can be any suitable material of the type that can be employed for providing a tobacco smoke filter for cigarettes. For example, a traditional cigarette filter material may be used, such as cellulose acetate tow, gathered cellulose acetate web, polypropylene tow, gathered cellulose acetate web, gathered paper, strands of reconstituted tobacco, or the like. Optionally, it may be preferred for the filter material to be filamentary or fibrous tow such as cellulose acetate, polyolefins such as polypropylene, or the like. One filter material that can provide a suitable filter rod is cellulose acetate tow having 3 denier per filament and 40,000 total denier. As another example, cellulose acetate tow having 3 denier per filament and 35,000 total denier can provide a suitable filter rod. As another example, cellulose acetate tow having 8 denier per filament and 40,000 total denier can provide a suitable filter rod. Normally a plasticizer such as triacetin or carbowax is applied to the filamentary tow in traditional amounts using known techniques. In one embodiment, the plasticizer component of the filter material comprises triacetin and carbowax in a 1:1 ratio by weight. The total amount of plasticizer is generally about 4 to about 20 percent by weight, preferably about 6 to about 12 percent by weight. Other suitable materials or additives used in connection with the construction of the filter element will be readily apparent to those skilled in the art of cigarette filter design and manufacture. Similarly, those of ordinary skill will understand that tobacco rods 12 may be formed having different characteristics; and that there are numerous different types of filtered cigarettes that may be formed from various combinations of numerous different types of filter elements and tobacco-containing rods.

In accordance with the first embodiment of this disclosure, each of the different types of two-up filter elements 70 are segregated into groups, and each of the groups may have a unique designation or identifier for distinguishing the groups from one another, and the identifiers may be used in a manner that seeks to verify that only the proper two-up filter elements are provided to the assembling equipment, as will discussed in greater detail below after a general discussion of the transporting of filter elements 70 from the filter-making equipment to the filter-supplying equipment 34 (FIG. 3), and the operation of the filter-supplying equipment.

Figure 3:
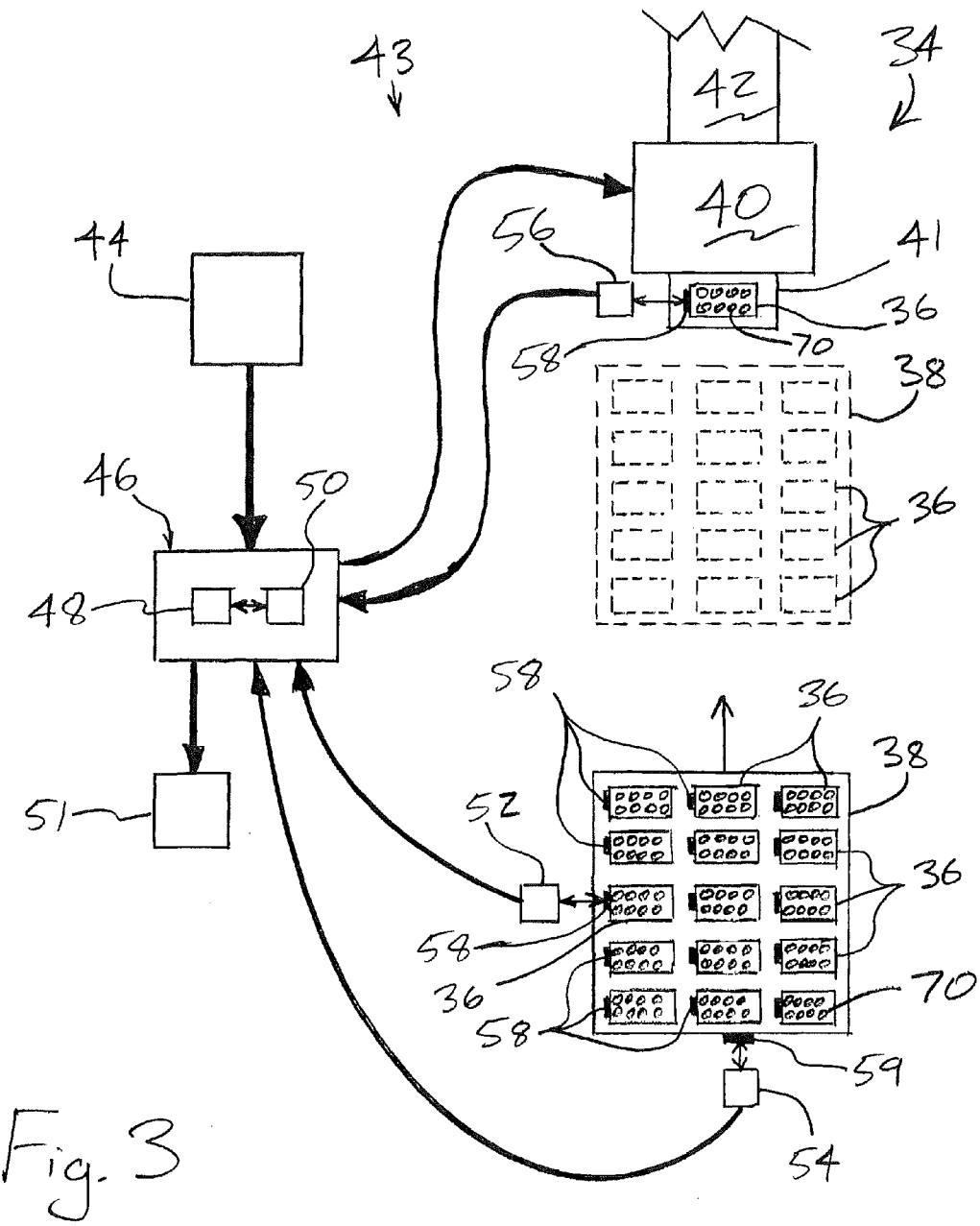
FIG. 3 is generally in the form of a block diagram that schematically illustrates some features of a portion of a system for making filtered smoking articles, and more specifically, FIG. 3 schematically illustrates a top plan view of portions of a filter verification system, in accordance with a first embodiment of this disclosure.

Referring to FIG. 3, groups of the two-up filter elements 70 (FIG. 4) manufactured by the filter-making equipment are typically placed into containers that may more specifically be in the form of upwardly open trays 36, so that each tray only includes filter elements that are of the same type/belong to the same group. FIG. 3 schematically illustrates that each of the trays 36 at least partially contains a group of the filter elements 70. A group of the trays 36 may be placed on a pallet 38 or other suitable device for transporting the trays in a downstream direction from the filter-making equipment to the filter-supplying equipment 34. In FIG. 3, the pallet 38 carrying the trays 36 is schematically illustrated in solid lines in an upstream location that is proximate the filter-making equipment, and that same pallet carrying the trays is schematically illustrated by dashed lines as being in a downstream location (e.g., predetermined location) that is proximate the filter-supplying equipment 34.

After the trays 36 with the filter elements 70 are transported to the filter-supplying equipment 34, the trays with the filter elements may be serially loaded onto a receiving area 41, or the like, of an unloader 40 of the filter-supplying equipment. The unloader 40 serially unloads (e.g., dumps) the filter elements 70 from the trays 36 so that the filter elements are received by a sender 42 of the filter-supplying equipment 34. The sender 42 provides (e.g., conveys) the unloaded filter elements 70 to assembling equipment, which will be discussed in greater detail below.

One aspect of this disclosure is the provision of a filter verification system 43 that is described in the following with reference to FIG. 3, in accordance with the first embodiment. Generally described, the filter verification system 43 is operative for preventing the unloader 40 from unloading the filter elements 70 from a container (e.g., tray 36) when it is determined that the incorrect filter elements are contained in the tray. For achieving this, the filter verification system 43 includes and/or operates in conjunction with several features of the making and packaging system. As should be apparent, the filter verification system 43 may be characterized as including and/or operating in conjunction with the unloader 40.

The filter verification system 43 may be characterized as including and/or operating in conjunction with a computerized making and packaging management system ("computerized management system 44") of the making and packaging system. It is conventional for a system for making and packaging filtered smoking articles, such as cigarettes 10, to include a computerized making and packaging management system for receiving inputs from, and providing instructions to, various components of the making and packaging system for at least partially facilitating the manufacture of the smoking articles (e.g., cigarettes 10). For example and reiterating from above, it is typical for a making and packaging system to be able to make a variety of different types of cigarettes 10 with different types of filter elements 26, 70.

The filter verification system 43 includes a computerized controller 46 (e.g., a computerized integrated process controller ("IPC")) for controlling operations taken to verify that the correct filter elements 70 are supplied to the assembling equipment of the making and packaging system. The computerized controller 46 may be characterized as being either incorporated into and/or separate from the computerized management system 44. As an example and not for the purpose of limiting the scope of this disclosure, the computerized controller 46 is shown in FIG. 3 as being at least partially separate from the computerized management system 44, and as including both a computer processor 48 and memory housing a database 50. The computerized controller 46 and its features (e.g., software modules, the computer processor 48 and/or memory/database 50) may be embodied in any suitable locations and/or forms.

As schematically shown in FIG. 3 by an arrow extending from the computerized management system 44 to the computerized controller 46, the computerized controller is in communication with the computerized management system for receiving, as an input, the identity of filter elements 70 that are supposed to be used in the assembling equipment of the making and packaging system for the production run presently being carried. As schematically shown in FIG. 3 by an arrow extending from the computerized controller 46 to the unloader 40, the computerized controller is in communication with the unloader for providing, as an output, a signal for preventing the unloader 40 from unloading the filter elements 70 from a tray 36 when it is determined that the incorrect filter elements are contained in the tray. As schematically shown in FIG. 3 by an arrow extending from the computerized controller 46 to a user interface that may be in the form of, or include, an electronic visual display 51 for the computerized controller, the computerized controller is in communication with the electronic visual display 51 for providing information to a human operator, such as a human responsible for serially, manually loading the trays 36 onto the receiving area 41 of the unloader 40, or the like. The electronic visual display 51 may be referred to as an operator control panel, monitor and/or a visual display unit.

As schematically shown in FIG. 3 by arrows respectively extending from upstream and downstream automated optical scanners 52, 54, 56 to the computerized controller 46, the computerized controller is in communication with the automated optical scanners for receiving, as inputs, information that is, or is associated with, identifiers of the trays 36 and groups of filter elements 70. More specifically, the upstream automated optical scanners 52, 54 are for respectively reading information from tray-identifying and filter-identifying labels 58, 59, and the downstream automated optical scanner 56 is for reading information from the tray-identifying labels 58. One of the upstream automated optical scanners 52, 54 may be omitted so that the remaining upstream automated optical scanner is for reading information from both the tray-identifying and filter-identifying labels 58, 59. Accordingly, throughout this disclosure, the tray-identifying and filter-identifying labels 58, 59 may be read with the same automated optical scanner, such as one of the upstream automated optical scanners 52, 54, so that the other of the upstream automated optical scanners may be omitted.

FIG. 3 schematically illustrates that each of the trays 36 at least partially contains a group of the filter elements 70, and that each tray has a tray-identifying label 58 attached thereto for traveling therewith. In addition, the trays 36 have associated therewith a filter-identifying label 59, as will be discussed in greater detail below. Each of the labels 58, 59 typically includes indicia that may be read with respective one(s) of the automated optical scanners 52, 54, 56. In the first embodiment, the indicia of the labels 58, 59 may be conventional barcodes, and each of the labels shown in FIG. 3 may be characterized as being schematically illustrative of indicia/a barcode. Notwithstanding, the indicia of the labels 58, 59 may be in any other form that is suitable for being read with an automated optical scanner or any other suitable scanning device, whether optical or non-optical.

For each tray 36 of the first embodiment, its tray-identifying label 58 includes unique indicia (e.g., a unique barcode) for distinguishing the tray from all of the other trays of the making and packaging system, so that the trays may be used in a manner that seeks to verify that only the proper filter elements 70 are provided to the assembling equipment. Typically, each tray's tray-identifying label 58 may be permanently, fixedly mounted to the tray, such as through the use of an adhesive material that provides a permanent bond, mechanical fasteners and/or through any other suitable technique. Alternatively, in some circumstances the tray-identifying label 58 may be in the form of cards that may be loosely placed in the trays 36 or releasably clipped to the trays, or the like.

Each filter-identifying label 59 may include unique indicia (e.g., a unique barcode) for distinguishing the filter elements 70 associated with the filter-identifying label from filter elements 70 that are not associated with the filter-identifying label. For all of the filter elements 70 that are grouped together and are of the same type, the group may be so large that the group is contained in multiple trays 36, and a single filter-identifying label 59 may be associated with the multiple trays, or multiple identical or substantially similar filter-identifying labels may be respectively associated with the trays. For example, when the filter-making equipment is operating to make a particular type of filter elements 70, it may be most efficient to make a large number of the particular type of filter elements, such that all of the trays 36 on a single pallet 38 may container the same particular type of filter elements. In situations like this where large lots of the same type of filter elements 70 may be made, a single filter-identifying label 59 may be mounted to the pallet 38 supporting all of the trays 36 with the same type of filter elements 70, or the filter-identifying label 59 may be placed or mounted in any other suitable location, such as by being mounted to a polymer film overwrap that extends around the trays 36 on the pallet. That is and more generally described, a single filter-identifying label 59 may be associated with a group of trays 36 that contain like filter elements 70. On the other hand, multiple identical or substantially similar filter-identifying labels 59 may be respectively associated with the trays containing like filter elements 70. As one example, each filter-identifying label 59 may include an adhesive backing for use in attaching the label to any suitable location. Alternatively, in some circumstances, the filter-identifying labels 59 may be more loosely associated with individual trays 36 or groups of trays, such as by being placed in the trays 36 or releasably clipped to the trays, or the like.

The filter-identifying labels 59 may not be permanently associated with the trays 36 because the trays may be reused in the process of making different types of cigarettes 10 with different filter elements 26, 70, such that when the filter elements 70 are unloaded from a tray, any filter-identifying label 59 affixed to the tray may need to be removed from the tray or otherwise be obscured, and each time an empty tray is refilled with a group of the filter elements 70 from the filter-making equipment, a new filter-identifying label 59 may be required. Accordingly, the filter-making equipment or some other suitable source may provide a filter-identifying label 59 that is intended to be used to identify the filter elements 70 at least partially contained by one or more trays 36. For example, each time a group of trays 36 is filled with the same type of filter elements 70, new filter-identifying label(s) 59 may be provided for the group of trays 36. A filter-identifying label 59 may be mounted, by way of an adhesive backing, to a pallet 38 carrying the group of trays, to an overwrap connecting the group of trays, or at any other suitable location. Alternatively, filter-identifying labels 59 may be respectively mounted, by way of a adhesive backings, to each of the trays 36.

In one specific example, each of the trays 36 may be a conventional type of tray that is for carrying filter elements 70, wherein the tray may include a polymeric body having a removable sidewall, and the removable sidewall may be constructed of cardboard. For each tray 36, its tray-identifying label 58 may be mounted to the polymeric body of the tray. The removable sidewalls may be conventionally referred to as swords. Each of the swords may have an appropriate filter-identifying label 59 mounted thereto, for identifying the filter elements 70 in the tray 36 that includes the sword.

Those of ordinary skill in the art will understand that it is conventional for indicia, such as a barcode, to provide information (e.g., a sequence of numbers) that may, on one hand, be characterized as directly identifying an object. On the other hand, the information (e.g., the sequence of numbers) provided by indicia may be characterized as identifying an object by way of association, such as through the use of a lookup table. More specifically, the information provided by the indicia may be used in a lookup table to determine that the information provided by the indicia is associated with (e.g., points to) an identifier of the object. Accordingly, for each of the labels 58, 59, its indicia may be read as information by a respective one of the automated optical scanners 52, 54, 56, and that read information may serve as an identifier for the respective tray 36 or group of filter elements 70, or that read information may be associated with an identifier for the respective tray 36 or group of filter elements 70, such as through the use of a lookup table or any other suitable techniques.

Some aspects of the operating of the filter verification system 43 may be controlled by the computerized controller 46. The instructions for operations controlled by the computerized controller 46 may be provided by one or more software modules that are executed on the processor 48 of the computerized controller. Alternatively, aspects of the operating of the filter verification system 43 may be controlled by any other suitable controller(s) such as, but not limited to, the computerized management system 44 and/or the subject software module(s) may be executed on any other suitable processor (s). Notwithstanding the fact that operations of the filter verification system 43 may be controlled in a wide variety of suitable manners, an example of a method of operating the filter verification system 43 is described in the following primarily with reference to the computerized controller 46 controlling the operations, in accordance with the first embodiment of this disclosure.

For each of the trays 36 and the group of filter elements 70 at least partially contained by the tray, the computerized controller 46 populates the database 50 by associating the following unique identifiers with one another: (i) a unique identifier of the tray, and (ii) a unique identifier of the group of filter elements that is at least partially contained by the tray. In the following, each unique identifier for a tray 36 may be referred to as a "tray identifier", and each unique identifier for a group of filter elements 70 may be referred to as a "filter identifier".

For example and not for the purpose of narrowing the scope of this disclosure, in the database 50, the tray identifier for a tray 36 may be a designation, name, identification number, or the like; or as more specific examples, the unique identifier for a tray may be "tray no. 13", or tray identifier may be a Universal Product Code ("UPC") barcode number, such as 63938200039, or the like. Also for example and not for the purpose of narrowing the scope of this disclosure, in the database 50, the filter identifier of a group of filter elements 70 may be a designation, name, identification number, or the like; or as more specific examples, the filter identifier may be "filter no. 11", or the filter identifier may be a UPC barcode number, such as 63938700034, or the like.

The trays 36 are typically used repeatedly in the making and packaging system, and the trays may be loaded with different types of filter elements 70 depending upon the type of smoking articles (e.g., cigarettes 10) being made. As one example, in the database 50, there may be a single database record for each tray identifier, and for each of the records there may be a field for receiving the filter identifier for the group of filter elements 70 that is presently at least partially contained in the tray 36 identified by the subject tray identifier. The computerized controller 46 typically controls the database 50 in a manner that seeks to ensure that there is no duplication of tray identifiers/records. For example, the database 50 may include only one record ("tray record") for each tray identifier, each record may have a specific field ("filter field") for receiving a filter identifier, and the filter fields of the database may be updated each time a tray 36 is supplied with a new group of filter elements. For example, for each tray 36, the filter field of the respective record in the database 50 may be updated each time the tray is proximate the upstream location that is schematically shown in FIG. 3 as being where the pallet 38 is shown in solid lines.

More specifically, with the pallet 38, which is carrying the containers (e.g., trays 36), in the upstream location represented by the pallet being shown in solid lines in FIG. 3, for each of the trays, the upstream automated optical scanners 52, 54 may be used to read the indicia of the tray-identifying label 58 and the associated filter-identifying label 59, respectively. For each tray 36, the information read from the indicia of the tray-identifying label 58 using the upstream automated optical scanner 52 is, or is associated with (e.g., via a lookup table), the tray identifier (e.g. designation, name, identification number, or the like) of the tray. Similarly, for each tray 36, for the group of filter elements 70 at least partially contained by the tray, the information read from the indicia of the filter-identifying label 59 using the upstream automated optical scanner 54 is, or is associated with (e.g., via a lookup table), the filter identifier (e.g. designation, name, identification number, or the like) of the group of filter elements 70. Alternatively, one of the scanners 52, 54 may be omitted, and a single scanner may be used to scan both types of labels 58, 59 at the upstream location. For each of the trays 36 at the upstream location, the tray identifier and the filter identifier for the filters 70 at least partially contained by the tray are "married together" or otherwise associated or correlated together by updating the tray's record in the database 50 to include the filter identifier for the filters presently contained in the tray/write over any filter identifier for the filters previously contained in the tray. As will be discussed in greater detail below, the correlated information may be used for preventing the unloader 40 from unloading the filter elements 70 from a tray 36 when it is determined that the incorrect filter elements are contained in the tray. In addition or alternatively, the correlated information may be used for other purposes, such as quality control or auditing purposes.

As one example, the tray-identifying labels 58 may be scanned using the scanner 52 while the trays 36 are being loaded onto the pallet 38. In accordance with an alternative embodiment, at the same time as the trays 36 are being loaded onto the pallet 38 and the tray-identifying labels 58 are being scanned using the scanner 52, the computerized controller 46 may be in more direct communication with the filter-making equipment for receiving the filter identifier for the filters in the trays being loaded onto the pallet (rather than receiving respective filter identifier by scanning a filter-identifying label 59 with the scanner 52), and the database 50 may be populated (e.g., updated) by associating the subject tray identifiers with the filter identifier received relatively directly from the communication with the filter-making equipment.

After the database 50 has been populated (e.g., updated) for the trays 36 and filter elements 70 supported by a pallet 38, the pallet may be transported to proximate the downstream location (e.g., predetermined location) that is schematically shown in FIG. 3 as being where the pallet 38 is shown in dashed lines. Then, the trays 36 may be manually or otherwise positioned onto the receiving area 41 of the unloader 40 one after the other. Each tray 36 may be positioned at the receiving area 41, and the downstream automated optical scanner 56 may be mounted, so that, for the tray on the receiving area 41, the label 58 on the tray is in the line of sight of the downstream automated optical scanner 56. In response to the label 58 of the tray 36 in the receiving area 41 being in the line of sight of the downstream automated optical scanner 56, the downstream automated optical scanner 56 scans (e.g., reads) the label 58 in the receiving area 41, and the computerized controller 46 receives the read information from the optical scanner 56. The information read from the indicia of the tray-identifying label 58 using the downstream automated optical scanner 56 is considered by the computerized controller 46 to be, or is associated by the computerized controller 46 with (e.g., via a lookup table), the tray identifier (e.g. designation, name, identification number, or the like) of the tray 36 located at the receiving area 41 of the unloader 40. Then, the computerized controller 46 queries the database 50 using the tray identifier of the tray 36 located at the receiving area 41 of the unloader 40, and receives from the database the filter identifier associated with the tray identifier of the tray 36 located at the receiving area 41 of the unloader 40.

During a given production run, the computerized management system 44 of the making and packaging system may be configured to know the identity of filter elements 70 that are supposed to be used in the assembling equipment of the making and packaging system for that production run, and in the first embodiment the computer controller 46 receives, as an input from the computerized management system 44 or any other suitable source, the filter identifier of the filter elements 70 that are supposed to be used in the assembling equipment of the making and packaging system for the production run presently being carried out. For example, the filter identifier of the filter elements 70 (i.e., the filter elements that are supposed to be used in the assembling equipment of the making and packaging system for the production run presently being carried out) may be, or may have been, input to the computerized management system 44 and/or the computerized controller 46 by a human operator using any suitable interface associated with the computerized management system 44 and/or the computerized controller 46.

Each time a tray 36 is positioned in the receiving area 41 of the unloader 40, in order to determine whether the proper filter elements 70 are contained in that tray, the computerized controller 46 determines whether there is a match between: (i) the filter identifier that the computerized management system most recently retrieved from (e.g., known from) the database 50 for the tray 36 located in the receiving area 41, and (ii) the filter identifier for the filter elements 70 that are supposed to be used in the assembling equipment of the making and packaging system for production run presently being carried, which may be received from (e.g., known from) the computerized management system 44 or any other suitable source. For each occurrence of the computerized controller 46 determining whether there is a match, the computerized controller 46 sends a signal instructing the unloader 40 to unload the tray 36 positioned in the receiving area 41 in response to the computerized controller 46 determining that the filter identifier received from (e.g., known from) the database 50 matches the filter identifier received from (e.g., known from) the computerized management system 44 or another suitable source.

For each occurrence of the computerized controller 46 determining whether there is not a match, the computerized controller 46 sends a signal instructing the unloader 40 to not unload the tray 36 positioned in the receiving area 41 in response to the controller 46 determining that the filter identifier received from the database 50 does not match the filter identifier received from the computerized management system 44 or an other suitable source. That is, the if there is a mismatch between the filter identifier received from the database 50 and the filter identifier received from the computerized management system 44, the computerized controller 46 may cause the unloader to stop operating, and thereby not unload the tray 36 positioned in the receiving area 41, and the unloader may not resume operation until a correct tray 36 is loaded onto the receiving area of the unloader. The computerized controller 46 may also initiate other corrective action, such as by providing instructions to a human operator, such as a human responsible for serially loading the trays 36 on the receiving area 41, or the like, by way of audio and/or video signals, such as signals provided to the electronic visual display 51. For example, the human operator may be instructed to remove a tray 36 from the receiving area 41 and/or take other corrective action.

As an alternative to the computerized controller 46 causing the unloader 40 to stop operating in order to prevent the wrong filter elements 70 from being supplied, the computerized controller 46 may cause other action to be taken to prevent the wrong filter elements 70 from being supplied. For example, the trays 36 may be supplied to the receiving area 41 of the unloader by a motor-driven conveyor belt, or the like, and the computerized controller 46 may send a signal that ceases operation of the motor-driven conveyor belt, or the like, in response to determining that there is a mismatch for a tray being carried by the conveyor belt.

The above-described method of operating the filter verification system 43 and associated features of the making and packaging system is repeated substantially continually, and the type of smoking articles (e.g., cigarettes 10) being made and packaged by the making and packaging system typically changed from time to time. Throughout, the filter verification system 43 operates in a manner that seeks to verify that the proper filter elements 70 are provided to the assembling equipment of the making and packaging system. At the same time as the filter-supplying equipment 34 is supplying filter elements 70 to the assembling equipment, the rod-supplying equipment is supplying tobacco rods 12, 12' (FIGS. 1 and 4) to the assembling equipment.

Figure 4:
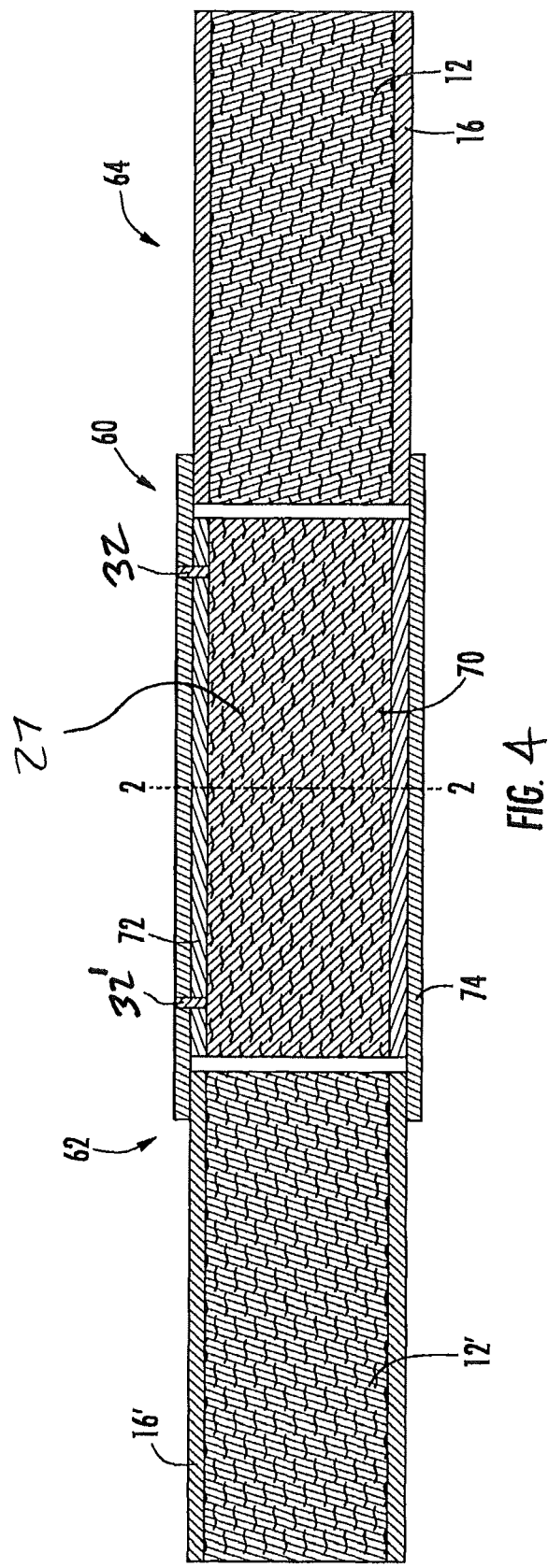
FIG. 4 is a cross-sectional view of a "two-up" cigarette rod prior to bifurcation during the cigarette manufacturing process.

Referring to FIG. 4, there is shown a representative two-up cigarette rod 60 that may be formed by the assembling equipment, and the assembling equipment typically cuts the two-up cigarette rod along dashed line 2-2 of FIG. 4 in order to provide two filtered cigarettes 62, 64 that each have the structure set forth in FIG. 2. To form a two-up cigarette rod 60, two tobacco rods 12, 12' are aligned at each end of a the two-up filter element 70 to form a precursor to a two-up cigarette rod. A layer of tipping material 74 (e.g., a so-called "patch" of tipping material) is wrapped around the aligned components of the precursor, such that the tipping material circumscribes the entire length of the two-up filter element 70, and a portion of the length of each tobacco rod 12, 12' in the respective regions thereof adjacent the two-up filter element. The tipping material 74 is typically attached to the plug wrap 72 and tobacco rods 12, 12' with adhesive material. As such, a so called two-up cigarette rod 60 is provided. Optionally, that cigarette 60 can be air diluted (e.g., using laser perforation techniques) by applying at least one circumscribing ring of perforations 32, 32' through the tipping material 74 and the underlying plug wrap 72. If desired, additional layers of tipping material could be applied to form smoking articles with multiple layers of tipping material. The two-up filter element 70 is ultimately cut in half along dashed line 2-2 of FIG. 4 to provide two finished cigarettes 62, 64.

A second embodiment of this disclosure is like the first embodiment of this disclosure, except for variations noted and variations that will be apparent to one of ordinary skill in the art. In accordance with the second embodiment, one or more of the tray-identifying and filter-identifying labels 58, 59 may include or be replaced with a radio frequency identification (RFID) tag, magnetic strip, or any other suitable device that may be automatically read, and a respective one or more of the automated optical scanners 52, 54, 56 may be replaced by, or supplemented with, an RFID tag reader, magnetic strip reader, or any other suitable device for automatically reading the respective identifiers.

A third embodiment of this disclosure, which may be like the first and/or second embodiments of this disclosure, except for variations noted and variations that will be apparent to one of ordinary skill in the art, is described in the following. At the beginning of a production run, or when manually requested, the computerized management system 44 downloads to the computerized controller 46 the identity of filter elements 70 that are supposed to be used in the assembling equipment of the making and packaging system for that production run. Alternatively, the computerized controller 46 may receive the identity of the filter elements 70 that are supposed to be used in a production run in any suitable manner, such as manually by way of the upstream automated optical scanner 52. In the third embodiment, the optical scanner 52 may be a hand-held scanner, and the other upstream automated optical scanner 54 may be omitted.

As mentioned above, for each of the trays 36, its tray-identifying label 58 may be mounted to the polymeric body of the tray, and the filter-identifying label 59 for the filter elements 70 within the tray may be mounted to the sword (e.g., a removable portion of the tray, such as a removable sidewall) of the tray. In the third embodiment, the database 50, or a portion of the database, has (only) twelve records, and only twelve of the trays 36 may be loaded onto the receiving area 41 (infeed conveyor belt) of the unloader 40. Different numbers of database records and different numbers of the trays 36 being loadable onto the receiving area 41 are within the scope of this disclosure. For example, typically more than twelve of the trays 36 will be used in a production run, and the database 50 may include a record for all of the trays (e.g., as discussed above) and/or trays that have been previously emptied.

For each of the trays 36 loaded onto the receiving area 41 of the unloader 40: both the tray-identifying label 58, which is mounted to the body of the tray, and the filter-identifying label 59, which is mounted to the sword of the tray, are read or were previously read by the optical scanner 52; the information read from the indicia of the tray-identifying label 58 using the optical scanner 52 is, or is associated with (e.g., via a lookup table), the tray identifier (e.g. designation, name, identification number, or the like) of the tray; and the information read from the indicia of the filter-identifying label 59 using the optical scanner 52 is, or is associated with (e.g., via a lookup table), the filter identifier of the filter elements 70. For each tray 36 positioned on (or to be positioned on) the receiving area 41 of the unloader 40, a record in the database 50 is populated with both the tray identifier, the filter identifier for the tray, and optionally also the date and time that the corresponding tray-identifying label 58 and/or the filter-identifying label 59 were scanned. That is, for each of the trays 36 loaded onto the receiving area 41 of the unloader 40, the tray identifier of the tray and the filter identifier of the filter elements 70 in the tray are "married together" or otherwise associated or correlated together in the tray's record in the database 50. Thereafter, for each tray 36 positioned on (or to be positioned on) the receiving area 41 of the unloader 40, the sword is removed from the body of the tray to facilitate unloading of the filter elements 70 from the tray.

The information read from the indicia of the tray-identifying label. 58 using the downstream automated optical scanner 56 is considered by the computerized controller 46 to be, or is associated by the computerized controller 46 with (e.g., via a lookup table), the tray identifier (e.g. designation, name, identification number, or the like) of the tray 36 located at the downstream end of the receiving area 41 of the unloader 40. Then, the computerized controller 46 queries the database 50 using the tray identifier of the tray 36 located at the downstream end of the receiving area 41 to determine whether the tray identifier for the tray 36 located at the downstream end of the receiving area 41 of the unloader 40 is included in one of the (e.g., twelve active) records of the database 50. If the tray identifier for the tray 36 located at the downstream end of the receiving area 41 of the unloader 40 does not match the database 50 (e.g., is not included in one of the (e.g., twelve active) records of the database 50, and thus is not identified in the database in a predetermined manner), or if the optical scanner 56 cannot read the tray-identifying label 58 of the tray 36 located at the downstream end of the receiving area 41 of the unloader 40, then the computerized management system 44 sends a signal instructing the unloader 40 to not unload the tray 36 positioned in the receiving area 41. The computerized management system 44 may send the signal instructing the unloader 40 to not unload the tray 36 positioned at the downstream end of the receiving area 41 in response to other criteria, such as if the filter identifier that is associated in the database 50 with the tray 36 located at the downstream end of the receiving area 41 of the unloader 40 does not match the identity of the filter elements that are supposed to be used in the assembling equipment for the present production run (e.g., as discussed above). In response to the signal instructing the unloader 40 to not unload the tray 36, or the like, the computerized management system 44 may initiate other corrective action, such as by providing instructions to a human operator, such as a human responsible for serially loading the trays 36 on the receiving area 41, or the like, by way of audio and/or video signals, such as signals provided to the electronic visual display 51. For example, the human operator may be instructed to remove a tray 36 from the receiving area 41 and/or take other corrective action.

The above examples are in no way intended to limit the scope of the present invention. It will be understood by those skilled in the art that while the present disclosure has been discussed above with reference to exemplary embodiments, various additions, modifications and changes can be made thereto without departing from the spirit and scope of the invention as set forth in the claims.

What is claimed is:

1. A method of at least supplying filter elements for smoking articles, the method comprising:
   having first information that is, or is associated with, an identifier of a group of filter elements;
   reading, with at least one automated data reader, second information that is, or is associated with, an identifier of a container, wherein the second information is read from a source that is for traveling with the container;
   associating, in a computer database, the identifier of the group of the filter elements with the identifier of the container;
   transporting the container while the group of filter elements is at least partially contained in the container, so that both the group of filter elements and the source of the second information travel with the container to a predetermined location;
   then verifying that the group of filter elements, which is at least partially contained by the container, is at the predetermined location, comprising
      reading, with an other automated data reader, the second information from the source of the second information while the container at least partially contains the group of filter elements, and while the container and the source of the second information are proximate the predetermined location, and
      querying the database using the second information read by the other automated data reader; and
   then unloading the group of filter elements from the container in response to the verifying that the group of filter elements is at the predetermined location,
   wherein
      the having of the first information comprises reading, with the at least one automated data reader, the first information,
      the reading of the first information with the at least one automated data reader comprises reading the first information from first indicia, which visually represents the first information, with a first automated optical scanner,
      the source of the second information is second indicia, which visually represents the second information, and the second indicia is mounted to the container,
      the reading of the second information with the at least one automated data reader comprises reading the second information from the second indicia with a second automated optical scanner, and
the other automated data reader is a third automated optical scanner.

2. The method according to claim 1, wherein:
the predetermined location is proximate an unloader in a system for making the smoking articles;
the unloader carries out the unloading of the group of filter elements from the container in response to the verifying that the group of filter elements is at the predetermined location; and
the reading of the first and second information is carried out upstream from the unloader in the system for making the smoking articles.

3. The method according to claim 1, wherein:
the first indicia is a first barcode;
the first automated optical scanner is a first barcode reader;
the second indicia is a second barcode that is mounted to the container for traveling with the container;
the second automated optical scanner is a second barcode reader; and
the third automated optical scanner is a third barcode reader.

4. The method according to claim 1, further comprising, after the unloading and for each filter element of the group of filter elements, joining the filter element to at least one rod that comprises tobacco.

5. The method according to claim 1, wherein:
the querying of the database comprises knowing the identifier of the group of filter elements from the database using the second information read by the other automated data reader; and
the verifying that the group of filter elements is at the predetermined location comprises
knowing the identifier of the group of filter elements from an other source, and
verifying sameness between
the identifier of the group of filter elements known from the other source, and
the identifier of the group of filter elements known from the database.

6. The method according to claim 5, wherein the knowing of the identifier of the group of filter elements from the other source comprises receiving the identifier of the group of filter elements from a computerized management system.

7. The method according to claim 1, further comprising:
reading, with the at least one automated data reader,
third information that is, or is associated with, an identifier of a second group of filter elements, and
fourth information that is, or is associated with, an identifier of a second container, wherein the fourth information is read from a source that is for traveling with the second container;
associating, in the computer database, the identifier of the second group of the filter elements with the identifier of the second container;
transporting the second container while the second group of filter elements is at least partially contained in the second container, so that both the second group of filter elements and the source of the fourth information travel with the second container to the predetermined location;
then determining that the second group of filter elements, which is at least partially contained by the second container, should not be at the predetermined location, comprising
reading, with the other automated data reader, the fourth information from the source of the fourth information while the second container at least partially contains the second group of filter elements and the second container is proximate the predetermined location, and
querying the database using the fourth information read by the other automated data reader;
then inhibiting any unloading of the second group of filter elements from the second container in response to the determining that the second group of filter elements should not be at the predetermined location; and
then removing the second container from the predetermined location while the second group of filter elements is at least partially contained in the second container.

8. The method according to claim 7, wherein
the querying of the database using the fourth information comprises knowing the identifier of the second group of filter elements from the database using the fourth information read by the other automated data reader; and
the determining that the second group of filter elements should not be at the predetermined location comprises identifying dissimilarity between
the identifier of the second group of filter elements known from the database, and
an identifier of a group of filter elements known from the other source.

9. A method of at least supplying filter elements for smoking articles, the method comprising:
at least partially containing groups of filter elements in respective containers; and
for each container and the group of filter elements at least partially contained in the container,
reading, with at least one automated data reader, an identifier of the container, wherein the identifier of the container is read from a source that is connected to the container for traveling with the container;
reading, with the at least one automated data reader, an identifier of the group of filter elements at least partially contained in the container;
then associating, in a computer database, the identifier of the group of the filter elements with the identifier of the container in response to at least both
the reading, with at least one automated data reader of the identifier of the container, and
the reading, with the at least one automated data reader, of the identifier of the group of filter elements at least partially contained in the container;
transporting the container while the group of filter elements is at least partially contained in the container, so that both the group of filter elements and the identifier of the container travel with the container to a predetermined location;
then reading, with an other automated data reader, the identifier of the container from the source connected to the container while both
the container at least partially contains the group of filter elements, and
the container and the source connected to the container are located at the predetermined location;
then using the identifier of the container read by the other automated data reader at the predetermined location to determine from the computer database the identifier of the group of filter elements at least partially contained by the container, comprising querying the computer database using the identifier of the container read by the other automated data reader at the predetermined location;

knowing the identifier of the group of the filter elements from an other source; and determining whether the identifier of the group of filter elements known from the other source matches the identifier of the group of the filter elements determined from the computer database using the identifier of the container read by the other automated data reader at the predetermined location and either unloading the group of filter elements from the container in response to determining that the identifier of the group of filter elements known from the other source matches the identifier of the group of the filter elements determined from the computer database using the identifier of the container read by the other automated data reader at the predetermined location, or inhibiting any unloading of the group of filter elements from the container in response to determining that the identifier of the group of filter elements known from the other source does not match the identifier of the group of the filter elements determined from the computer database using the identifier of the container read by the other automated data reader at the predetermined location.

10. The method according to claim 9, comprising serially providing the containers to an unloader in a system for making the smoking articles, wherein:

the predetermined location is proximate the unloader;
the unloader carries out the unloading of the group of filter elements from the container; and
the reading of the first and second information is carried out upstream from the unloader in the system for making the smoking articles.

11. A method of at least supplying filter elements for smoking articles, the method comprising:

reading, with at least one automated data reader, an identifier of a container, wherein the identifier of the container is read from a source that is connected to the container for traveling with the container;

reading, with the at least one automated data reader, an identifier of a group of filter elements at least partially contained in the container;

then associating, in a computer database, the identifier of the group of the filter elements with the identifier of the container in response to at least both the reading, with the at least one automated data reader, of the identifier of the container, and
the reading, with the at least one automated data reader, of the identifier of the group of filter elements at least partially contained in the container;

transporting the container while the group of filter elements is at least partially contained in the container, so that both the group of filter elements and the identifier of the container travel with the container to a predetermined location;

then reading, with an other automated data reader, the identifier of the container from the source connected to the container while both the container at least partially contains the group of filter elements, and
the container and the source connected to the container are located at the predetermined location;

then using the identifier of the container read by the other automated data reader at the predetermined location to determine from the computer database the identifier of the group of filter elements at least partially contained by the container, comprising querying the computer database using the identifier of the container read by the other automated data reader at the predetermined location;

knowing the identifier of the group of the filter elements from an other source;

verifying sameness between the identifier of the group of the filter elements from the other source and the identifier of the group of the filter elements determined from the computer database using the identifier of the container read by the other automated data reader at the predetermined location; and then unloading the group of filter elements from the container in response to the verifying of sameness between the identifier of the group of the filter elements from the other source and the identifier of the group of the filter elements determined from the computer database using the identifier of the container read by the other automated data reader at the predetermined location.

12. The method according to claim 11, wherein the knowing of the identifier of the group of filter elements from the other source is comprised of receiving the identifier of the group of filter elements from a computerized management system.

13. The method according to claim 11, wherein:

the predetermined location is proximate an unloader in a system for making the smoking articles; and
the unloader carries out the unloading of the group of filter elements from the container in response to the verifying of the sameness between the identifier of the group of the filter elements from the other source and the identifier of the group of the filter elements associated with the identifier of the container in the computer database.

14. The method according to claim 11, further comprising, after the unloading and for each filter element of the group of filter elements, joining the filter element to at least one rod that comprises tobacco.

15. The method according to claim 11, wherein:

the source of the identifier of the container is a radio frequency identification ("RFID") tag, and the RFID tag is connected to the container for traveling with the container;

the reading of the identifier of the container with the at least one automated data reader is comprised of reading information associated with the container from the RFID tag with a first RFID tag reader; and the other automated data reader is a second RFID tag reader.

16. The method according to claim 11, wherein the container is a tray comprising a body and a removable sidewall, the source of the identifier of the container is connected to the body, and the identifier of the group of filter elements is connected to the removable sidewall.

17. The method according to claim 16, further comprising removing the sidewall from the container prior to the unloading of the group of filter elements from the container.

* * * * *